United States Patent
Stoker et al.

(10) Patent No.: US 11,170,782 B2
(45) Date of Patent: Nov. 9, 2021

(54) REAL-TIME AUDIO TRANSCRIPTION, VIDEO CONFERENCING, AND ONLINE COLLABORATION SYSTEM AND METHODS

(71) Applicant: Speech Cloud, Inc., Provo, UT (US)

(72) Inventors: Cameron Stoker, Provo, UT (US); Kyle Hale, Provo, UT (US)

(73) Assignee: SPEECH CLOUD, INC, Provo, UT (US)

( * ) Notice: Subject to any disclaimer, the term of this patent is extended or adjusted under 35 U.S.C. 154(b) by 0 days.

(21) Appl. No.: 16/843,617

(22) Filed: Apr. 8, 2020

(65) Prior Publication Data

US 2020/0321007 A1 Oct. 8, 2020

Related U.S. Application Data

(60) Provisional application No. 62/831,024, filed on Apr. 8, 2019.

(51) Int. Cl.
*G10L 15/26* (2006.01)
*H04N 7/15* (2006.01)

(52) U.S. Cl.
CPC .............. *G10L 15/26* (2013.01); *H04N 7/15* (2013.01)

(58) Field of Classification Search
CPC ....... G06F 3/165; G06F 40/51; G09B 21/009; G09B 21/04; G10L 15/26; G11B 33/025;
(Continued)

(56) References Cited

U.S. PATENT DOCUMENTS 6,542,582 B1 *  4/2003  Smith, Jr. ......... H04M 3/42391
                                                              379/52
6,618,704 B2    9/2003  Kanevsky et al.
(Continued)

FOREIGN PATENT DOCUMENTS

GB      2375258 A    11/2002
WO  2011014927 A1     2/2011

OTHER PUBLICATIONS

"Amazon Transcribe," Retrieved from https://aws.amazon.com/transcribe/ on Mar. 30, 2020.
(Continued)

*Primary Examiner* — Gerald Gauthier
(74) *Attorney, Agent, or Firm* — Workman Nydegger

(57) ABSTRACT

A real-time audio transcription, video conferencing, and online collaboration system system includes a microphone that records audio from a lecturer, a camera that captures video from the lecturer and/or users, and a user interface for viewing a transcription of the audio. The audio recording is transmitted to a storage device, such as a personal computer or mobile device, which transmits the audio to a voice-to-text application for transcription. The storage device may do so via a third-party cloud server, a web application, or a software application. The transcribed text is then transmitted to a user interface for viewing by hearing-impaired persons. The transcribed text is provided in real-time with the lecturer and audio-recording and presented word-for-word to the user during transcription and may be edited in real-time to improve accuracy of the automatic transcription.

20 Claims, 7 Drawing Sheets

(58) Field of Classification Search
CPC ............. G11B 27/031; H04M 1/2475; H04M 3/42153; H04N 7/15; H04R 1/028; H04W 4/12; A61B 3/0025; A61B 3/032; A61B 5/681
USPC ............. 379/52, 202.01; 381/312, 313, 317; 704/231, 270, 270.1, 2, 235, 277; 707/737; 340/573.1; 382/116, 131; 434/323

See application file for complete search history.

(56) References Cited

U.S. PATENT DOCUMENTS

| | | | | |
|---|---|---|---|---|
| 6,754,631 | B1* | 6/2004 | Din | G10L 15/26 704/270 |
| 6,810,116 | B1* | 10/2004 | Sorensen | H04M 3/56 379/202.01 |
| 6,820,055 | B2 | 11/2004 | Saindon et al. | |
| 6,988,138 | B1 | 1/2006 | Alcorn et al. | |
| 7,493,077 | B2 | 2/2009 | Coleman et al. | |
| 7,822,610 | B2* | 10/2010 | Burns | G06F 3/167 704/270.1 |
| 7,979,281 | B2* | 7/2011 | Kahn | G10L 15/22 704/270 |
| 8,239,207 | B2 | 8/2012 | Seligman et al. | |
| 8,335,689 | B2 | 12/2012 | Wittenstein et al. | |
| 8,352,261 | B2 | 1/2013 | Terrell, II et al. | |
| 8,583,030 | B2 | 11/2013 | Rao | |
| 9,240,127 | B2 | 1/2016 | Wong et al. | |
| 9,350,857 | B1* | 5/2016 | Engelke | H04W 4/90 |
| 10,601,980 | B1* | 3/2020 | Engelke | G09B 21/004 |
| 10,692,497 | B1* | 6/2020 | Muske | G10L 15/26 |
| 2006/0271370 | A1* | 11/2006 | Li | G10L 15/26 704/277 |
| 2007/0196007 | A1* | 8/2007 | Chen | A61B 6/482 382/131 |
| 2008/0261191 | A1* | 10/2008 | Woolf | G06Q 50/20 434/323 |
| 2012/0281885 | A1* | 11/2012 | Syrdal | G10L 21/06 382/116 |
| 2013/0041646 | A1* | 2/2013 | Farley | G08B 25/14 704/2 |
| 2014/0088962 | A1* | 3/2014 | Corfield | G10L 15/26 704/235 |
| 2015/0100578 | A1* | 4/2015 | Rosen | G06F 16/23 707/737 |
| 2015/0230033 | A1* | 8/2015 | Sprague | G10L 13/00 381/313 |
| 2015/0319546 | A1* | 11/2015 | Sprague | H04R 1/105 381/312 |
| 2015/0326965 | A1* | 11/2015 | Sprague | H04R 25/652 381/317 |
| 2016/0360034 | A1* | 12/2016 | Engelke | H04L 67/02 |
| 2017/0092274 | A1* | 3/2017 | Kaufmann | G06F 40/58 |
| 2017/0201613 | A1* | 7/2017 | Engelke | G10L 15/06 |
| 2017/0206808 | A1* | 7/2017 | Engelke | H04M 1/2475 |
| 2017/0206888 | A1* | 7/2017 | Engelke | G10L 15/26 |
| 2017/0277684 | A1* | 9/2017 | Dharmarajan Mary | G06K 9/00355 |
| 2017/0330471 | A1* | 11/2017 | Subiakto | G06F 3/165 |
| 2018/0034961 | A1* | 2/2018 | Engelke | H04M 1/72478 |
| 2018/0039625 | A1* | 2/2018 | Hayashi | G06F 40/51 |
| 2018/0103859 | A1* | 4/2018 | Provenzano | A61B 5/681 |
| 2019/0066531 | A1* | 2/2019 | Kaplan | G10L 15/26 |
| 2019/0110096 | A1 | 4/2019 | Shaw et al. | |
| 2019/0147721 | A1* | 5/2019 | Avitan | G08B 21/0446 340/573.1 |
| 2019/0175011 | A1* | 6/2019 | Jensen | A61B 3/0033 |
| 2019/0312973 | A1* | 10/2019 | Engelke | H04M 1/72433 |
| 2020/0321007 | A1* | 10/2020 | Stoker | G10L 15/26 |

OTHER PUBLICATIONS

Iglesias et al., "Avoiding Communication Barriers in the Classroom: the APEINTA Project," Universidad Carlos III de Madrid, at least as early as Dec. 31, 2014, pp. 1-15.

Wald, "Captioning for Deaf and Hard of Hearing People by Editing Automatic Speech Recognition in Real Time," Learning Technologies Group, School of Electronics and Computer Science University of Southampton, publication date unknown, but at least before Apr. 8, 2020, pp. 1-8.

Bumbalek et al., "Cloud-Based Assistive Speech-Transcription Services," R&D Centre for Mobile Applications (RDC), Department of Telecommunications Engineering, Faculty of Electrical Engineering, Czech Technical University in Prague, at least as early as Dec. 31, 2012, pp. 113-116.

"Easyclass," Retrieved from https://www.easyclass.com/ on Mar. 30, 2020.

"Transcribing Audio From Streaming Input," Google Cloud, Retrieved from https://cloud.google.com/speech-to-text/docs/streaming-recognize on Mar. 30, 2020.

Sperber et al., "Optimizing Computer-Assisted Transcription Quality with Iterative User Interfaces," Proceedings of the 10th Language Resources and Evaluation Conference—LREC, May 23-28, 2016, pp. 1986-1992.

Canary, "Real-Time Transcription and Captioning with Rev.ai Streaming API," Automated Transcription, Rev, Retrieved from https://www.rev.com/blog/real-time-transcription-and-captioning, dated Oct. 24, 2019, pp. 1-3.

Ranchal et al., "Using Speech Recognition for Real-Time Captioning and Lecture Transcription in the Classroom," IEEE Transactions on Learning Technologies, vol. 6, No. 4, at least as early as Dec. 31, 2013, pp. 299-311.

Iglesias et al., "Web Educational Services for All: The APEINTA Project," Proceedings of the International Cross Disciplinary Conference on Web Accessibility, at least as early as Dec. 31, 2011, pp. 1-3.

* cited by examiner

REAL-TIME AUDIO TRANSCRIPTION, VIDEO CONFERENCING, AND ONLINE COLLABORATION SYSTEM AND METHODS

THE FIELD OF THE INVENTION

Embodiments of the present disclosure relate generally to audio transcription systems, video conferencing, and online collaboration systems. More specifically, the present disclosure relates to real-time audio transcription and editing, video conferencing, and online collaboration systems and methods.

BACKGROUND

There are numerous students throughout the world who may struggle with one or more aspects of traditional in-person and online classrooms, lectures, events, workplaces, and other gatherings. There are many non-traditional students such as part-time students, single parents, and others who may not be able to attend in-person lectures regularly or who may be taking classes on a periodic basis. There are additionally many people with disabilities that impede their ability to participate effectively in lectures, classes, presentations, events, workplaces, or other gatherings and collaborations. It is estimated that there is a person with a disability in one household in three.

For example, there are thirty-five million people with some form of hearing loss in the United States. Ten million of those are hard of hearing, meaning a typical hearing aid does not provide sufficient hearing assistance to hear normal conversations, and nine-hundred thousand of those are deaf.

Resources provided to hearing-impaired persons who attend public lectures, presentations, and talks are limited. Typically, in order for a hearing-impaired person to participate in real-time in such settings, for example a university lecture, an additional person must transcribe the professor's words. Human transcription can be inaccurate, slow, and expensive for either the university or student.

Human transcription further is a grueling job, with the transcriber being required to type at up to 200 words per minute for hours at a stretch with expectations of the transcription having perfect or near-perfect fidelity to the audio stream or lecture. The services of human transcribers that are trained to perform word-for-word transcriptions are expensive and scarce. As a result, hearing-impaired persons often lose or miss out on information from the lecture and are not able to participate live with the professor or other students, due to the time delay of human transcription, all while universities and other organizations spend large sums of money on said services.

Recently, a number of online and other electronic transcription services have been made available. However, current systems do not provide real-time transcriptions that can be displayed to a user during a lecture. Also, these electronic transcription technologies are not "real-time," in the sense that they transcribe audio in sections, such as in whole sentences or paragraphs at a time, in order to alter words based on context and surrounding words before displaying the text. The sentences or paragraphs being transcribed are displayed in time-delayed batches of text and are not word-for-word, live transcriptions.

Another issue with existing electronic transcription services, i.e. artificial intelligence ("AI") transcription services, is the inability to edit the transcription to correct errors. Existing automatic transcription software is highly error-prone, and the hardware associated with the software, such as microphones, is often of varying and unreliable quality. The resulting transcription errors can severely limit a user's learning or participation in an online learning setting.

While ex post facto correction of errors by accessibility personnel may assist users who watch or listen to recorded lectures after the fact, existing modalities lack the ability for a user, participant, or other personnel to make corrections in substantially real time, i.e. during an audio or video stream, to automatic transcriptions. Such in-the-moment corrections may be important because of innate skepticism regarding the accuracy of AI transcription services. Additionally, many accessibility centers of universities have personnel providing full-time transcription services, providing further inertia militating against the adoption of AI transcription services. While certain AI speech-to-text services have been promoted, human transcribers remain the primary form of live transcription services because of the accuracy, nuance, and sophistication of a human transcriber.

Legal issues also arise for students or other persons using current transcription services in university, church, or other lecture settings. A hearing-impaired person may need to get permission to record and transcribe a lecture, such as from a professor or university accessibility center, which may or may not be given due to copyright or other concerns. Thus, a system-wide approach having institutional permissions in place prior to lectures is necessary for hearing-impaired persons to avoid needing to ask permission before each class, which can be embarrassing and inconvenient.

Likewise, for blind students, numerous obstacles to normal participation in events remain, including the ability to receive information, including a transcription of a lecture or presentation, in braille or alt text, while retaining the benefits of live participation and interaction with a presenter and/or with other participants in the event.

Additionally, for people with learning disabilities, it may be difficult to participate in a live class, lecture, presentation, or workplace event at the same pace as others. For such people, it would be beneficial to be able to review or process material from the event at a desired pace and in a safe environment, while retaining the benefits of live participation; however, no such modality current exists.

Another problem in the art is the inability to easily convert any classroom, lecture, or event into a video conferencing and online learning and collaboration community, as evidenced by the disruption from the 2020 COVID-19 pandemic, which has forced the closure or partial-closure of schools and universities with little or no advance notice. Creating an accessible and/or interactive video conferencing and online learning and collaboration community that facilities streaming of audio, video, and audio transcription directly to attendees' personal devices, while providing for recording the video, audio, and audio transcription for later access and use and providing for in-the-moment editing of audio transcription for non-traditional users as well as retaining the feel and benefits of live, in-person participation, for both in-person and remote attendees, remains an unresolved challenge.

One of the challenges with at least partly converting a classroom or event into an online collaboration community is the difficulty of a presenter or lecturer being able to gauge participation and understanding by the various users, of which there may be a few or there may be thousands, and who may participate simultaneously or at different times. There is a need for a system for providing live data regarding how the participants are responding to the event or presentation, allowing the lecturer to leader to pivot accordingly.

In short, there is a need for an improved real-time audio transcription, video conferencing, and online collaboration system that facilitates improved participation at different times, locations, and manners while retaining the benefits and feel of live, in-person participation in a lecture, event, workplace, or otherwise. Additionally, there is a need for a system that allows an entirely pre-recorded lecture to have the benefits of live participation.

Accordingly, there are a number of disadvantages in the art of online collaboration, video conferencing, and real-time transcription systems and methods that can be addressed.

BRIEF SUMMARY

The present disclosure relates generally to audio transcription systems. More specifically, the present disclosure relates to real-time audio transcription, video conferencing, and online collaboration systems and methods. For example, in one embodiment of the present disclosure, a real-time audio transcription, video conferencing, and online collaboration system includes one or more processors and one or more computer-readable hardware storage devices. The storage devices include computer-executable instructions stored thereon that are executable by the one or more processors to cause the real-time audio transcription, video conferencing, and online collaboration system to transcribe audio, record and stream video, and facilitate collaboration and interaction between participants, both in-person and remotely located. The instructions may cause the system to access an audio recording that is or was generated using a microphone, transcribe the audio recording, and display the audio recording in real-time as the microphone generates the audio recording.

The instructions may alternatively or in addition cause the system to access a video recording that is or was generated using a camera, record, transmit, and/or store the video recording, and display the video recording in real-time as the camera generates the video recording. The instructions may alternatively or in addition cause the system to access or present an interactive feature such as a survey, quiz, questionnaire, assignment, to or between user interfaces.

In one embodiment of the present disclosure, a real-time audio transcription, video conferencing, and online collaboration system includes a microphone, one or more processors, and one or more computer-readable hardware storage devices. The storage devices include computer-executable instructions stored thereon that are executable by the one or more processors to cause the system to transcribe audio, conference video, and provide a space for online collaboration.

The instructions do so by causing the system to use the microphone to generate an audio recording. Also, the system transcribes, using a voice-to-text application, the audio recording to generate a transcription of the audio recording. Also, the system displays, on a user interface, the transcription of the audio recording. The instructions further cause the system to receive, transmit, and display video images, presentation images, comments, and other interactive features.

In one embodiment of the present disclosure, one or more computer readable mediums have executable instructions stored thereon. When executed by one or more processors, the instructions are configured to cause a computer system to use a microphone to generate an audio recording and transmit the audio recording to a storage location. The computer system also accesses the audio recording using a cloud storage server, transcribes the audio recording into text, and displays the text on a user interface.

In one embodiment, a method of transcribing audio into text in real-time includes obtaining an audio recording with a microphone and transmitting the audio recording to a storage device. The method includes transcribing the audio recording into text using a voice-to-text application. The method also includes displaying the text word-for-word to a user via a user interface as the voice-to-text application transcribes the audio into the text.

A user or a human editor may access the transcribed text in real-time and provide real-time or substantially real-time edits to the transcription during the course of a presentation or lecture so as to improve the quality of an automatic transcription. This advantageously reduces the burden on human transcribers, increases the speed at which users may access the transcription of an event, and improves the accuracy of automatic transcriptions. The edits may be made by a dedicated transcriber, such as an accessibility center employee, or may be crowdsourced to one or more end users who may note errors and provide corrections thereto that are visible to the other users.

In embodiments, a microphone, camera, screen, speaker, and other hardware corresponding to an individual user or a group of users (such as gathered in a classroom) may cooperate with a microphone, camera, screen, speaker, and other hardware corresponding to other users to form a system that provides real-time or substantially real-time audio transcription, video conferencing, and online collaboration.

The system may advantageously allow for an entirely pre-recorded lecture or event to have the benefits and feel of a live event by facilitating interactive participation with the lecture or event using the modalities of the disclosed embodiments.

Additional features and advantages of exemplary embodiments of the present disclosure will be set forth in the description which follows, and in part will be obvious from the description or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations and/or embodiments thereof which are illustrated in the appended drawings. Understanding that these drawings depict only typical implementations and/or embodiments of the invention and are not therefore to be considered to be limiting of its scope, the invention will be described and explained with additional specificity and detail through the use of the accompanying drawings in which.

DETAILED DESCRIPTION

The present disclosure relates generally to audio transcription, video conferencing, and online collaboration systems. More specifically, the present disclosure relates to real-time audio transcription, video conferencing, and online collaboration systems and methods. Embodiments of systems described herein provide real-time display of audio-to-text transcription in a lecture setting, such as a lecture from a professor in a classroom.

Systems and methods described herein enable hearing-impaired persons to attend and participate in live lectures without noticeable time delays between the audio recorded from the professor and the transcribed text being displayed. Such embodiments can be implemented on an institutional level to provide seamless access to hearing-impaired persons without excessive setup or permissions. Additionally, the systems of embodiments of the disclosure advantageously allow for in-the-moment editing of a real-time audio-to-text transcription, thereby correcting errors that may arise from an automatic transcription service.

Figure 1:
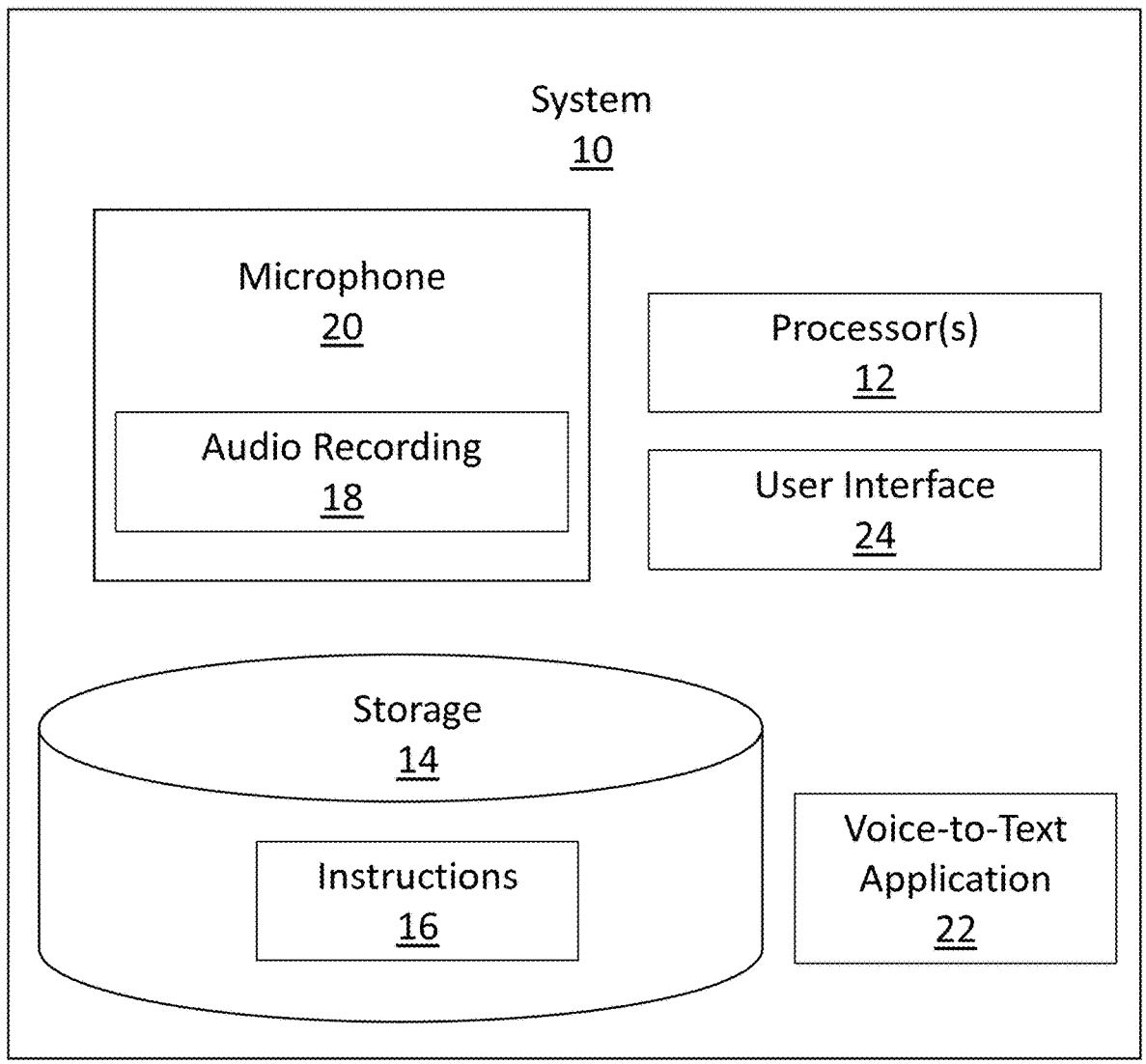
FIG. 1 illustrates an embodiment of a real-time audio transcription, video conferencing, and online collaboration system, according to an embodiment of the present disclosure.

Turning now to FIG. 1, in at least one embodiment, a real-time audio transcription, video conferencing, and online collaboration system 10 includes one or more processors 12 and one or more computer-readable hardware storage devices 14 having stored thereon computer-executable instructions 16. The instructions 16 are executable by the one or more processors 12 to cause the real-time audio transcription, video conferencing, and online collaboration system 10 to transcribe audio by causing the real-time audio transcription system 10 to access an audio recording 18 that was or is being generated using a microphone 20.

In at least one embodiment, the system 10 transcribes the audio recording using a voice-to-text application 22 and displays the audio recording 18 in real-time as the microphone 20 generates the audio recording 18. In such an embodiment, the storage device 14 may transmit the audio recording 18 to a voice-to-text application 22 that transcribes the audio recording 18 into text. The instructions 16 cause the text to be displayed on a corresponding user interface 24.

In at least one embodiment, the storage device 14 is a personal computer, such as a laptop, or other mobile device, such as a mobile phone, or the like. Also, in at least one embodiment, the user interface 24 is a hearing-aid device, such as commonly used hearing aids or headphones. Additionally, or alternatively, in at least one embodiment, the storage device 14 includes the user interface 24. For example, in at least one embodiment, the user interface 24 is a display on the screen of a laptop or other personal computer. In at least one embodiment, the user interface 24 is a display on the screen of a mobile phone or other mobile device.

Figure 2:
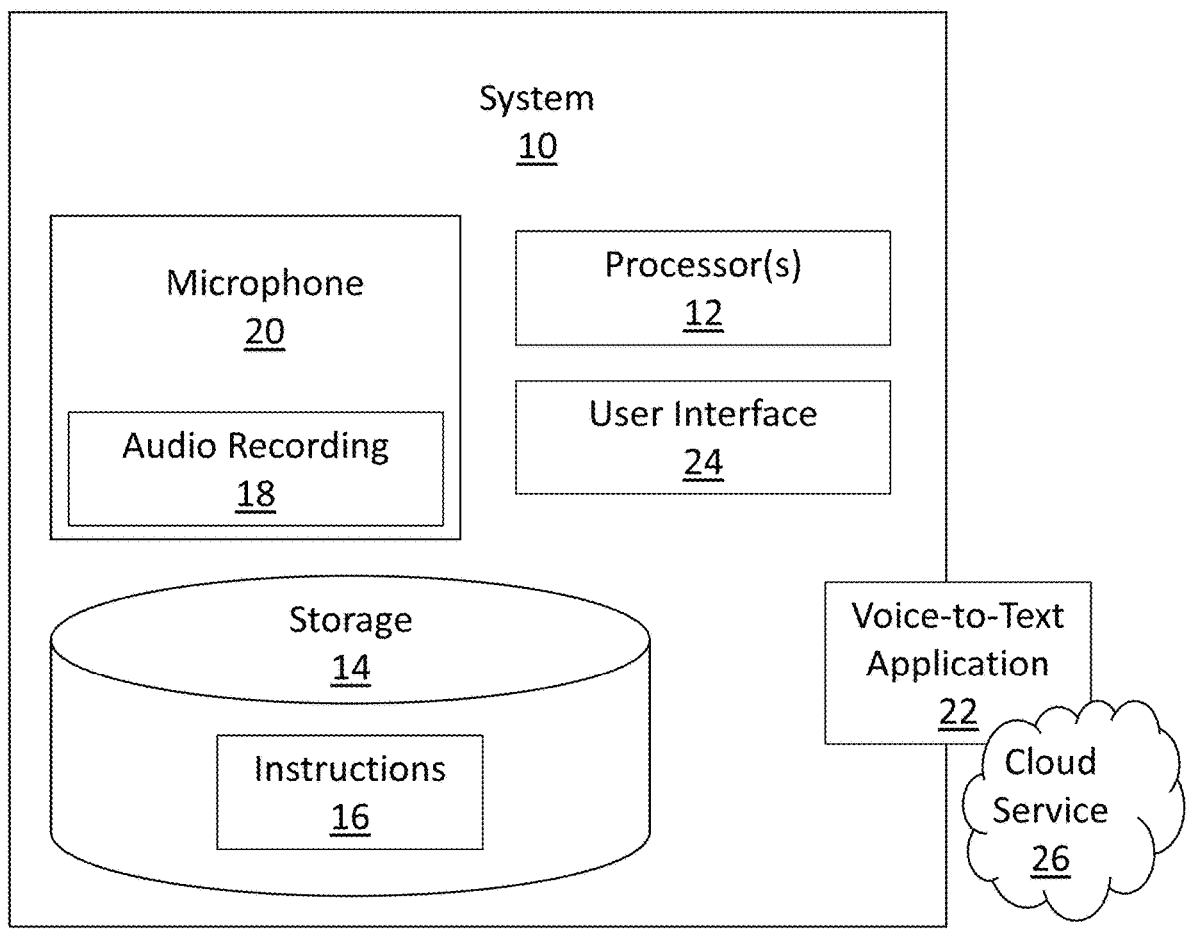
FIG. 2 illustrates an embodiment of a real-time audio transcription, video conferencing, and online collaboration system, according to an embodiment of the present disclosure.

In at least one embodiment, the voice-to-text application 22 includes a web-application accessed by the storage device 14. Alternatively, in at least one embodiment, the voice-to-text application 22 is a software application stored on the storage device 14. Furthermore, in at least one embodiment, as illustrated in FIG. 2, the voice-to-text application includes a third-party cloud service 26 accessed by the voice-to-text application 22. The cloud service 26 includes voice-to-text transcription capabilities which can transcribe the audio recording 18 into text for the voice-to-text application 22 to transmit to the user interface 24, such as to a display screen of a mobile phone or laptop computer. For example, voice-to-text transcription capabilities, whether as part of the voice-to-text application 22 or the cloud service 26, may include any suitable voice-to-text transcription modality, including suitable artificial intelligence ("AI") transcription packages.

Figure 3:
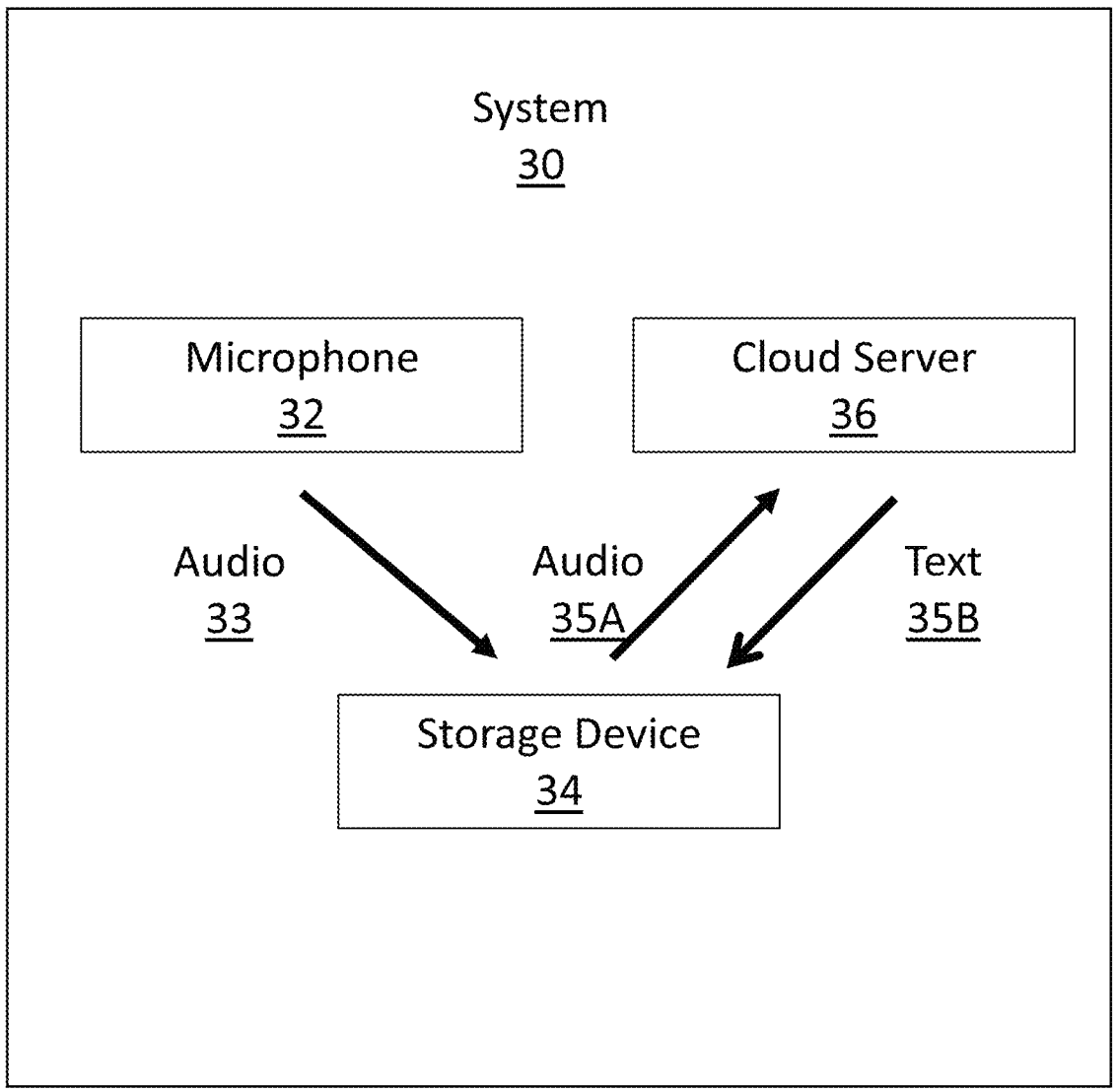
FIG. 3 illustrates an embodiment of a real-time audio transcription, video conferencing, and online collaboration system, according to the present disclosure.

As shown in FIG. 3, in at least one embodiment, a transcription system 30 includes a microphone 32 that records audio 33 from a lecture or speaker and transmits that audio 33 to a storage device 34, such as a mobile phone. The storage device 34 transmits the audio 35A received from the microphone 32 to a cloud server 36, for example through an online web application. The cloud server 36 transcribes the audio 35A into text 35B through any suitable transcription modality as described above and transmits the text back to the storage device 34 for a hearing-impaired person to see and read, advantageously allowing a hearing-impaired person to participate during and with a lecture, class, or other event without requiring the use of an in-person interpreter and without requiring the hearing-impaired person to wait for ex post facto human or automatic transcription of the audio.

In at least one embodiment, the transcription system 30 provides the text to the storage device 34 in real-time. That is, the cloud server 36 transmits the text to the storage device 34 word-for-word as the audio is transcribed. In at least one embodiment, the cloud server does not translate in batches of sentences or paragraphs. Rather, the cloud server 36 transmits interim results of sentences and paragraphs being transcribed, meaning word-for-word transcription, back to the storage device 34 for viewing.

Additionally, or alternatively, in at least one embodiment, the storage device 34 includes a user interface that allows the user to select how many words are transmitted back from the cloud server 36 to the storage device at a time. For example, in at least one embodiment, the user selects a setting to receive three transcribed words at a time from the cloud server. In at least one embodiment, the user selects a setting to receive whole sentences at a time. Thus, the transcription system 30 is customizable to the preference of the user.

In at least one embodiment, the microphone 32 is separate from the storage device 34, such that the microphone 32 may be placed closer to the lecturer or arranged to be portable. For example, in at least one embodiment, the microphone 32 includes a movable or wireless microphone placed on or near the lecturer. Additionally, or alternatively, the microphone 32 includes a stationary microphone at or near a podium or other structure at which the lecturer is positioned. In other embodiments, a microphone of an electronic device belonging to the lecturer, such as a smartphone or a laptop computer, may be utilized and configured to cooperate with the system 30.

In at least one embodiment, the microphone 32 may include an omni-directional microphone that can record and transmit multiple voices. This may be advantageous, for example, for the transcription system 30 to provide transcribed audio from a number of sources, for example multiple lecturers and/or audience members who may ask questions during a lecture, and so forth.

Along these lines, in the embodiments of systems described herein, the system may provide a user with an option/command to change the direction of the microphone 32, whether omni-directional or not, during use. In this way, the user can direct the microphone to those speaking during a lecture to optimize the clarity of the audio recording obtained by the microphone 32. The option or command to change the direction of the microphone 32 may be based on an assessment of the clarity of the captured audio as compared to a baseline audio recording or standard stored on the storage device 34.

In at least one embodiment, microphones 32 that are separate from the storage device may transmit audio recordings to the storage device 34 through audio wires, or wirelessly using common wireless transmission means known in the art. Such wireless transmission means may include, but are not limited to Bluetooth connections or wireless internet connections. Any suitable connection may be used to connect the microphone 32 to the system 30. Additionally, or alternatively, in at least one embodiment, the storage device 34 includes or is coupled to the microphone 32, such as microphones typically included with laptops and mobile phones.

Figure 4:
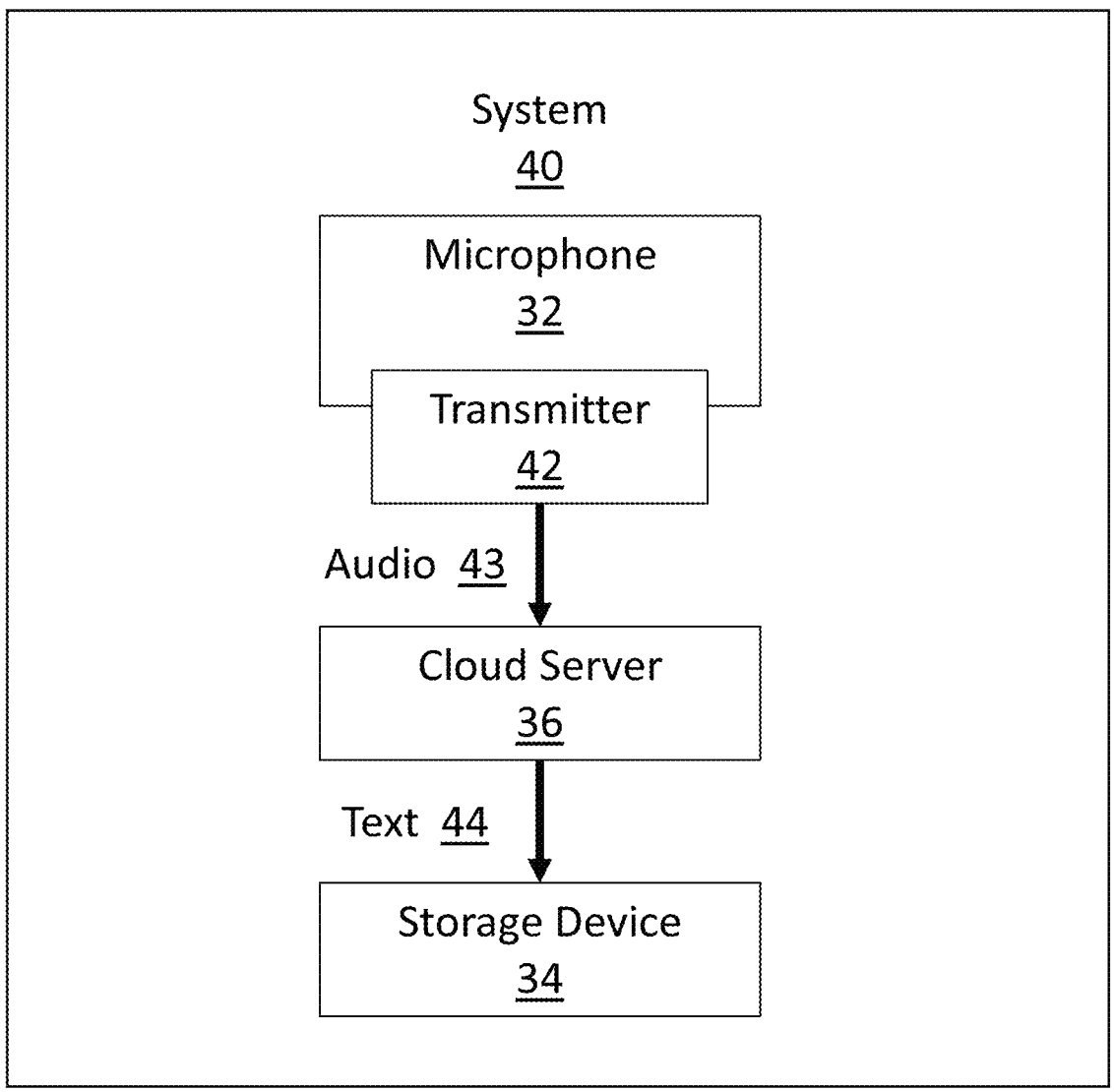
FIG. 4 illustrates an embodiment of a real-time audio transcription, video conferencing, and online collaboration system, according to the present disclosure.

FIG. 4 illustrates an embodiment of a real-time audio transcription, video conferencing, and online collaboration system 40 according to the present disclosure that includes a microphone 32 that has a transmitter 42 that directly transmits captured audio 43 to a cloud server 36. Such an embodiment may be advantageous, for example, in settings where the microphone 32 is a built-in microphone that cannot be connected directly to the storage device 34. In such an embodiment, the cloud server 36, such as a server operating a web-application or a third-party voice-to-text transcription service, receives audio directly from the transmitter 42 and transmits the transcribed text 44 to the storage device 34 for display to the user.

Figure 5:
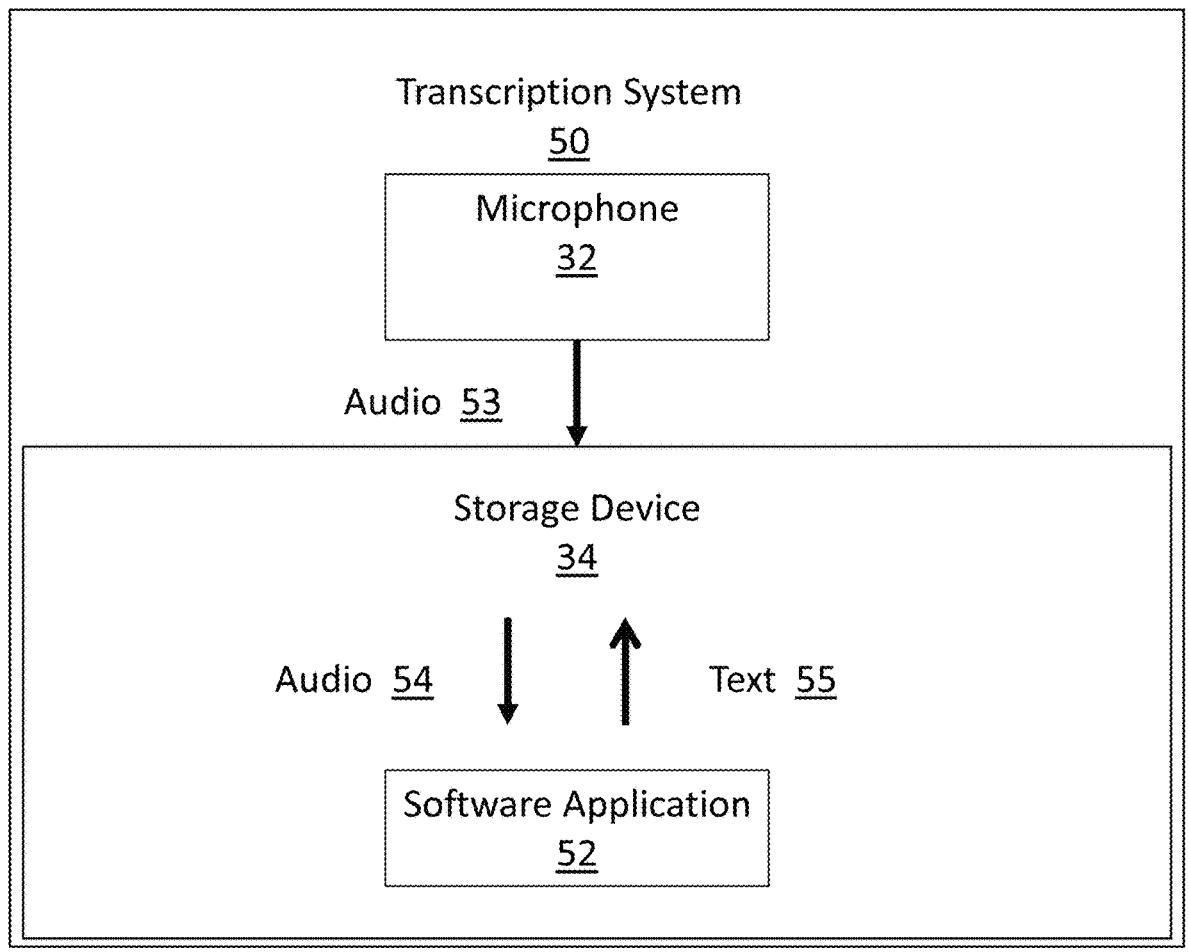
FIG. 5 illustrates an embodiment of a real-time audio transcription, video conferencing, and online collaboration system, according to an embodiment of the present disclosure.

Additionally, or alternatively, as shown in FIG. 5, in at least one embodiment, a transcription system 50 includes a storage device 34 that includes a software application 52 for automatically transcribing audio into text. For example, in such an embodiment, the microphone 32 transmits audio to the storage device 34 and the storage device 34 inputs the audio into the software application 52. In at least one embodiment, the software application 52 includes computer-executable instructions stored on the storage device 34 so that the software application 52 can be used in settings that lack internet connectivity.

In such an embodiment, no internet connection is required to transmit the audio received from the microphone 32 to the software application 52. The software application 52 transcribes the audio into text and transmits the text back to the storage device 34 to display to the user. The software application 52 may be configured to transcribe and transmit the audio and text from and/or into a plurality of languages in real-time or substantially real-time, with a small delay.

In contrast to existing translation software which has not become widespread in online collaboration due to its limitations and accuracy issues, the systems and methods of the disclosed embodiments advantageously provide an improved real-time translation by facilitating automatic translation supplemented by real-time editing by one or more users, and/or by providing an algorithm in the audio transcription application that translates words rather than phrases.

In embodiments, the audio transcription application algorithm segments transcribed words of a speaker based on one or more of voice fluctuations, grammar, pauses, or other speech features, designating such subdivisions of the transcribed words as individual segments. The segments are then translated as a phrase to capture context and language-specific phrasing. It has been surprisingly found that by providing an audio transcription application comprising an algorithm configured to subdivide audio based on speech features as described above to translate whole phrases rather than individual words, the translation is up to 40% more accurate than a word-for-word translation.

In addition to the embodiments described above and shown in the Figures, one or more other embodiments of real-time transcription systems may include additional or alternative features. For example, in at least one embodiment, the web-applications, cloud servers, and/or software applications described herein allow users to log in to an account that links them to certain events/lectures. In this way, multiple users can log in to an event and receive transcribed text from a single microphone. In addition, in at least one embodiment, the microphone and/or web applications or software applications described herein can transmit audio from the same lecture or event to multiple individual hearing aid devices and/or headphones at the same time, further improving the efficiency of the system and for individual users.

Along these lines, the web-applications and/or software applications described herein may be implemented at an institutional level, such as by a university accessibility center, so that permissions are granted by the institution. In this way, hearing-impaired persons do not need to seek permission from individual lecturers to record and/or transcribe lectures. Rather, a university, for example, would pre-approve use of the transcription system for all classes and lectures so that hearing-impaired students simply log in with an account and participate in lectures in real-time as necessary.

In at least one embodiment, the participant can connect a Bluetooth-enabled hearing aid device or other headphone device to the storage devices described herein. In such an embodiment, the web-applications, cloud servers, and/or software applications described herein can stream the audio directly to that hearing device. This may be advantageous for hearing-impaired persons who are not deaf, but are either hard of hearing or have hearing loss, and are still be able to hear amplified audio through a hearing aid or headphones directly next to their ears.

Along these lines, in embodiments where audio is sent to Bluetooth-enabled hearing aid devices, the web-applications, cloud servers, and/or software applications described herein may include features for customizing the frequency or frequency range at which the audio is transmitted to the hearing aid device. This may be advantageous because hearing-impaired persons have unique frequency ranges in which they can better hear audio. As such, each user can customize the frequencies to optimize the audio feed individually, even when multiple users are logged in to a single event. It will be understood that users may additionally adjust one or more of a volume of the audio, a frequency through which the audio is transmitted through a speaker, or a speaker through which the system transmits audio.

In at least one embodiment, a transcription system includes web-applications, cloud servers, and/or software applications described herein that include the option to save text or audio being transcribed for post lecture notes.

In at least one embodiment, a transcription system includes web-applications, cloud servers, and/or software applications described herein that include message boards. The user(s) can type questions into the message board and the system can transmit those questions to the lecturer. In this way, each user can not only receive real-time transcription of the lecture, but they can participate and interact with the lecturer in real-time.

In at least one embodiment, the web-applications, cloud servers, and/or software applications described herein include features to improve accuracy of word-for-word, real-time transcription of audio. Typical voice-to-text applications calculate the accuracy of each word transcribed, the accuracy often being represented with a probability/percentage of the word being correctly transcribed from the audio. For example, the application may calculate a 97% accuracy for a certain word, meaning the application is 97% certain that the word was transcribed correctly. A lower percentage represents a lower accuracy rating, and vice versa.

Accordingly, in at least one embodiment, the web-applications, cloud servers, and/or software applications described herein may offer the option for the user to select from a word bank of related words when the accuracy of a transcribed word falls below a threshold. For example, in at least one embodiment, the threshold may be 90%. If the accuracy rating for a given word falls below 90%, the user is presented with one or more alternative words. The user, using the context and subject matter of the lecture, can either select the transcribed word or select one of the alternative words presented from the word bank. In this way, the user can improve the accuracy of the transcription in real-time. Additionally, or alternatively, the user can select alternative words later, after the lecture has been completed.

In addition, in at least one embodiment, the accuracy of the transcription system is improved over time as recurring speakers are recorded and as users select alternative words from the word bank. Machine learning algorithms can be implemented to learn and improve transcription accuracy based on the lecturer, who may have a unique accent or who uses unique phrases, and the alternative words selected by users from the word bank when encountering accuracies below a threshold, as described above.

A work bank algorithm may determine the accuracy of every word transcribed live by assessing alternative interpretations of a spoken word. For example, if a speaker uses the word "cat," the word bank algorithm may assess with a first threshold certainty, such as 95%, that the word is "cat," but may also assess with a second threshold certainty, such as 3%, that the word is "hat," and a third threshold certainty, such as 2%, that the word is "mat." When the first threshold certainty is below a threshold amount, as described above, other possible interpretations may be presented to allow a user to select one of the alternative words if the transcription would be better served.

For example, the other interpretations or alternative words that are presented to a user may be selected based on a predetermined threshold certainty. That is, in embodiments, if the second and third threshold certainties are above a certain level, such as 5%, the corresponding alternative words may be shown to a user in any suitable manner. For example, the alternative words may be shown upon a user hovering over the word in question. While the above embodiment has been described, it will be appreciated that any suitable number of alternative words, any suitable certainty thresholds, and any suitable manner of presenting alternative words to a user may be used.

Figure 6:
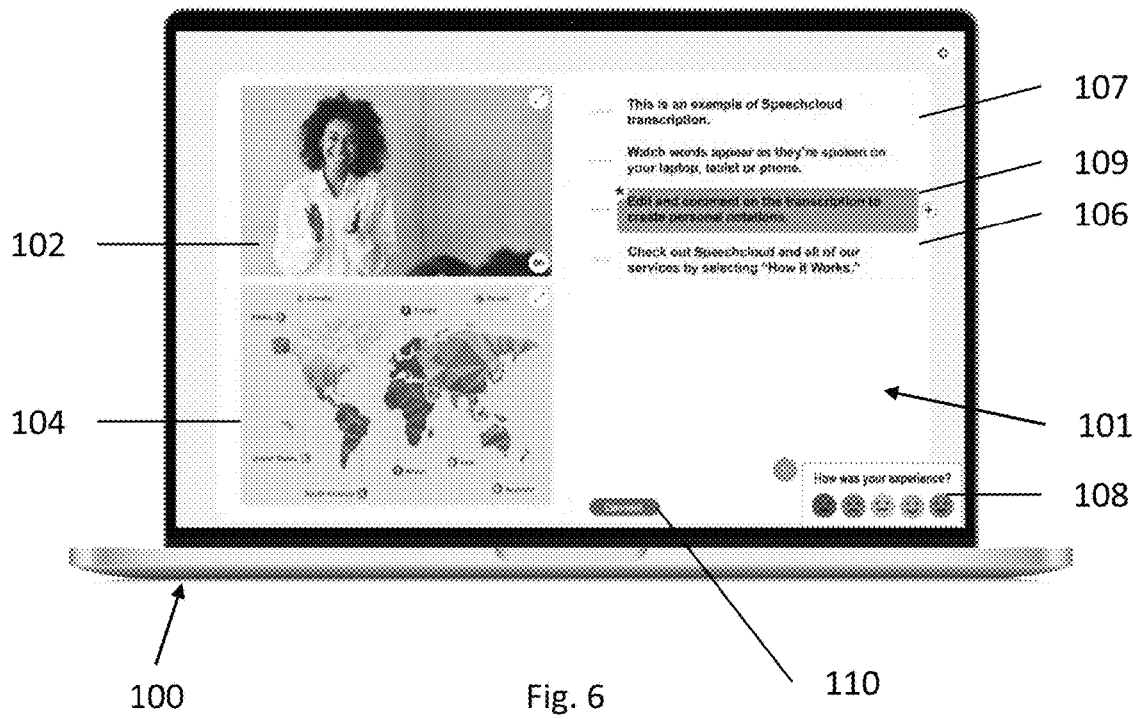
FIG. 6 illustrates an embodiment of a user interface of a real-time audio transcription, video conferencing, and online collaboration system according to an embodiment of the present disclosure.
Figure 7:
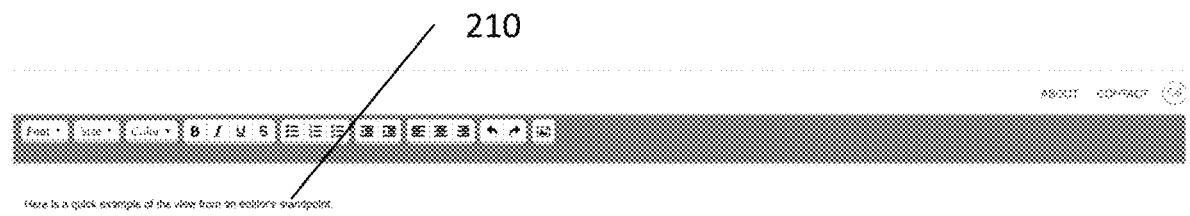
FIG. 7 illustrates another embodiment of a user interface of the system of FIG. 6.
Figure 7:
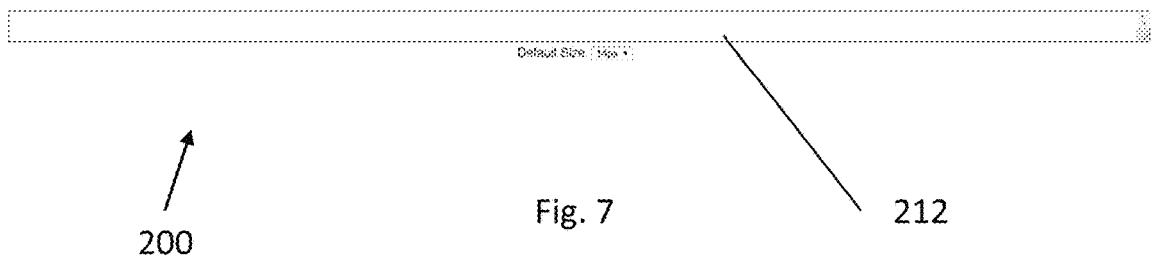
Figure 8:
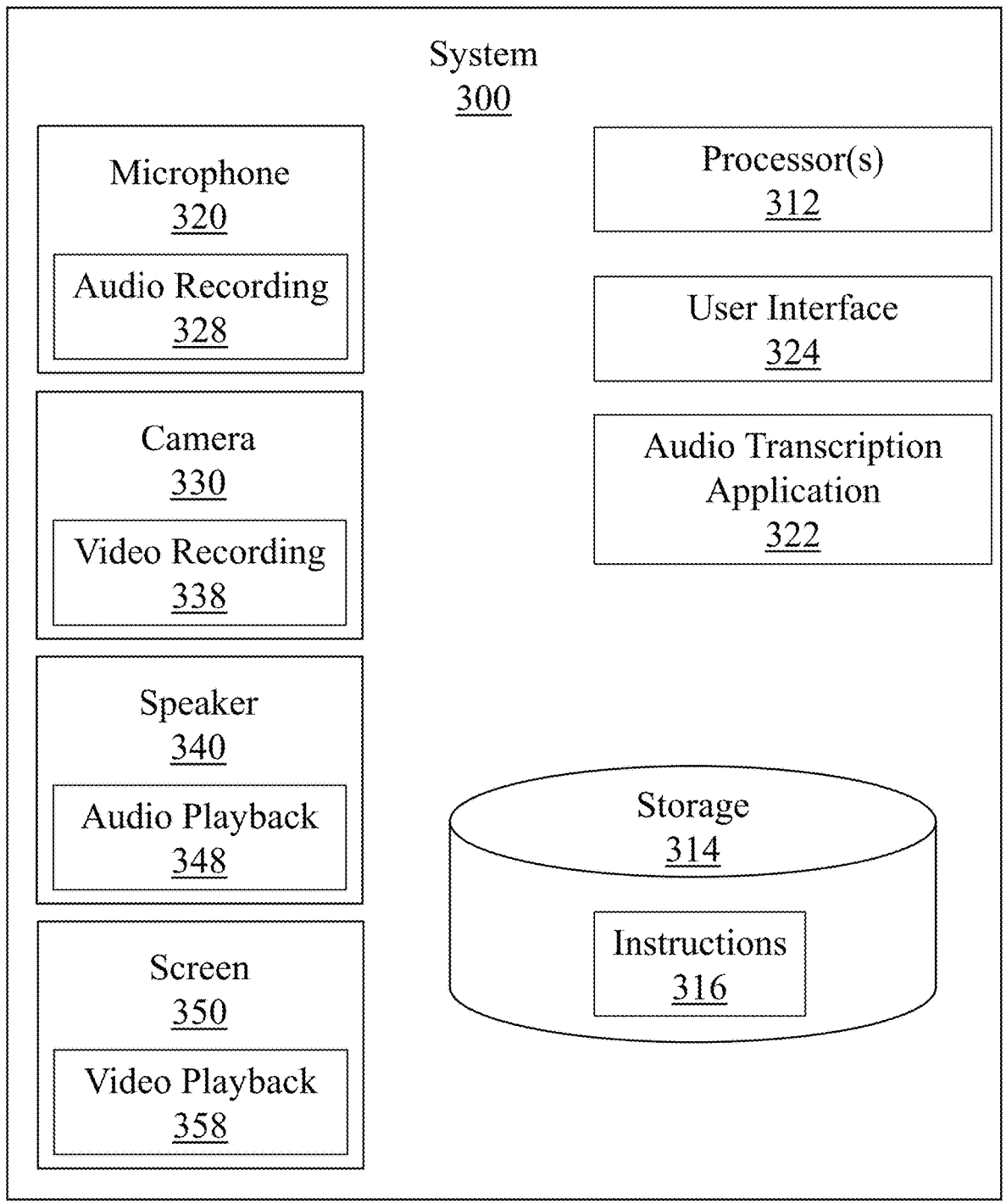
FIG. 8 illustrates another embodiment of a real-time audio transcription, video conferencing, and online collaboration system.

As seen in FIGS. 6-8, a real-time audio transcription, video conferencing, and online collaboration system may be configured to cooperate with at least one user device 100 including a user interface 101. The user device 100 may be a laptop computer, a desktop computer, a mobile phone, a tablet, or any other suitable device, and may be used by a user in person (i.e. attending a particular lecture or event) or remotely (i.e. a user participating in a lecture or event from a different location). The user device 100 may connect a user by any suitable modality, including through an internet connection, such as a Wifi connection.

The user interface 101 may include a lecture screen 102, a presentation screen 104, and an interactive section 106. The lecture screen 102 may show the user a video recording in substantially real time of a lecturer or presenter, such as a professor or a teacher. The presentation screen 104 may show the user a presentation corresponding to the lecturer or presenter's lecture, such as a slideshow presentation, a video, images, graphics, graphs, or any other suitable presentation.

The lecture screen 102 and the presentation screen 102, 104 may be configured to be toggled to a full-screen mode. Both the lecture screen 102 and the presentation screen 104 may further be configured to be interactive, such that a user may add comments, images, or otherwise. The user interface 101 may be configured to allow the user to present via the presentation screen 104 or to be visible to other users or the lecturer through the lecture screen 102.

The interactive section 106 may comprise one or more interactive features, including but not limited to transcribed audio messages 107, comments 109, and/or feedback 108. The comments 109 may be distinguishable from the transcribed audio messages 107 by having a different shape, color, font, or other suitable indicia. A comment bar 110 may be provided to allow a user to add comments 109 by typing, dictating, or otherwise that may be configured to be visible to a group, such as a class to which the lecturer is presenting, or to be visible only to the user. The comment bar 110 and the interactive section 106 may further allow the user to highlight, emphasize, or otherwise edit the transcription text in real-time. Other interactive features may include quizzes, questions to or from the presenter, image sharing, audio sharing, and any other interactive feature. In embodiments, the comments, messages, feedback, and other interactive features, such as assignments, may be time-stamped.

The interactive features such as quizzes, surveys, and otherwise may be prepared in advance by a presenter and saved in a database, and then accessed and shown to users at a desired time. Similarly, the response from users to quizzes, surveys and other interactive features may be saved in the database. The responses from users may be selected to be anonymous, or may be saved to a user profile and viewed later and exported to a compatible learning management system via the LTI standard. The survey results can be shown by the presenter to the users or may be kept hidden.

The system may be configured to allow a presenter to see a list of users who are or have been participating or have one or more of the audio, video, or transcription muted, and which users responded to quizzes, surveys, and other interactive or participation-based features.

In embodiments, users may interact with a recorded video or audio presentation as if it were a live presentation and without any perceivable difference from live participants, and without any necessary perception that the presentation is recorded rather than live. That is, a user may participate in and respond to quizzes, questions, or other activities that were recorded in a previous live broadcast of a video or audio presentation and at the moment in the recording corresponding to when the presenter actually issued the quiz or question, which advantageously increases engagement with a presentation, as users have been found to be 75% more likely to watch an online presentation or video if it is live.

A user interface 200 facilitating real-time edits to an automatic transcription according to the foregoing embodiments is shown in FIG. 7. The user interface 200 may comprise a transcription bar 210 in which the real-time or substantially real-time transcription results of an automatic transcription as described previously. The user interface 200 may be particularly suited to a user tasked with editing in-the-moment the results of the automatic transcription to correct errors in the transcription, allowing hard-of-hearing users, deaf users, or users who for other reasons have not been able to access the audio directly to participate in real-time in the lecture, presentation, or event.

As the transcription bar 210 displays the automatic transcription results, the user may utilize an editing bar 212 to edit the results as necessary, for example to correct incorrectly transcribed words, supply missing or inaudible words, or to provide context and clarity as necessary. A user for whom the user interface 200 may be particularly suitable may include personnel in an accessibility center of a university, for example.

In embodiments, any user may be authorized to propose or make edits to the transcription in real-time and said edits may be visible to one or more other users. The edits made to the transcription in the transcription bar 210 may include any suitable formatting or effects, such as style, comments, key words, highlighting, font, color, weight, size, and other effects, which may be visible in real-time to users. In embodiments, the changes made by an editor or a user can be seamlessly combined with the automatic live transcript using operational transformation technology.

According to embodiments of the disclosure, the user interfaces described herein may be a user interface 324 of a system 300 for real-time audio transcription, video conferencing, and online collaboration. The system 300 may comprise, as described in previous embodiments, at least one microphone 320, at least one camera 330, at least one speaker 340, at least one screen 350, at least one processor 312, at least one audio transcription application 322, and at least one storage component 314 comprising instructions 316. The system 300 may be entirely customizable for an individual user's needs; for example, some users or presentations may not benefit from video streaming or interactive features such as surveys, and corresponding features may accordingly be omitted or deactivated from the user interface 324.

The system 300 may be housed in a single device, such as a user's laptop computer or mobile device, or may be distributed across a plurality of devices and/or a network of devices. As described previously, the system 300 may be configured to transmit data from a microphone 320, camera 330, speaker 340, and/or screen 350 on individual end user devices using suitable modalities to a remotely located central processor 312 and/or a central storage 314 module, for example. In embodiments, the audio transcription application 322 may be accessed and utilized by the remotely located central processor 312, with the resulting text information sent back to the individual end user devices, all in real-time or substantially in real-time.

The system 300 can be configured to utilize multiple microphones and corresponding audio streams, multiple cameras and corresponding video streams, and multiple screens, multiple end user devices, and multiple locations as suitable. In embodiments, the system 300 may be configured for an end user device to correspond to multiple individuals, such as a classroom full of people, while other end user devices are individual users who are remotely participating, with a same, similar, or different user interface corresponding to all end user devices.

The instructions 316 stored on or accessed by the storage 314 may be executable by the processor 312 to cause the system 300 to receive, transcribe, transmit, and display audio and corresponding text, to receive, transmit, and display video and other images, and to facilitate interactive features via at least the user interface 324. The video, audio, text, and participation may also be recorded by the system 300 and stored on the storage 314.

The audio recording 328 that the system 300 captures using the microphone 320 may be transmitted to the storage 314 using any suitable transmission modality and transcribed as described herein by the audio transcription application 322, with the transcribed audio being delivered to the user interface 324 and the audio recording 328 provided to a user as audio playback 348 through the speaker 340. Similarly, the video recording 338 that the system 300 captures using the camera 330 may be transmitted to the storage 314 using any suitable transmission modality and stored, recorded, and transmitted to the user via the user interface 324 on a screen 350 as video playback 358.

Advantageously, the system 300 may be dispersed across and facilitate access and participation by a virtually unlimited number of users, allowing a single live lecture, presentation, or event to be broadcast with live, automatic audio transcription, edited in real-time, to all users. This significantly reduces the cost of accessibility centers and others providing transcription services for deaf or hard-of-hearing users and facilitates participation by such users in a live presentation or lecture. In embodiments, the system 300 may utilize web socket connections, a real-time database, and the Web Real-Time Communication standard to allow any number of connections simultaneously.

The system 300 may be configured to stream video in a one-way fashion, such as from a presenter to one or more users, and not the other way around. In embodiments, the system 300 may stream video in a substantially two-way fashion, such as to allow users to participate by asking and answering questions, participating in quizzes, and otherwise. In such instances when more than one user may be speaking at a time and/or when the audio quickly switches between multiple users (for example panelists addressing users, theater applications, question and answer sessions, or discussions), the system 300 and in particular the audio transcription application 322 may assign the transcribed text of the audio stream an identifier such that a user can ascertain which user is responsible for corresponding portions of the transcribed text.

The user interface 324 may comprise a data dashboard providing data taken from user quizzes, surveys and questionnaires to provide live feedback and participation, with the data linked into a slide deck that shows the data changing and rising during a presentation. Advantageously, the user may thus participate with all of the users despite being remotely located. The data dashboard may also be provided in summaries and analytics to an organization such as a university hosting the presentation, lecture, or event, allowing the speaker such as a professor to ascertain where the students are, which elements of the presentation the users are engaging with, and how to improve participation.

In at least one embodiment, the transcribed text from the transcription system is shown on the lecturer's screen when presenting to allow participants to read along while viewing a presentation. In this way, a presentation used by the lecturer can serve as the user interface described herein, thus enabling multiple users to receive the transcribed text from a single user interface. This eliminates the need for each user to have their own storage device, such as a laptop computer or mobile phone.

The user interface 324 may further facilitate the use and creation of online breakout rooms that group one or more users together for further and more exclusive discussion, collaboration, and discussion based on a presentation or event. For example, a lecturer may utilize the user interface 324 to automatically group participants or users into breakout rooms of a predetermined size (such as three users each) for a predetermined amount of time to discuss a particular detail, to prepare an answer to a question, or otherwise.

The user interface 324 may be further configured to facilitate creation, distribution, and grading of assignments among users. The user interface 324 may allow for a lecturer to create either beforehand, during, or after a presentation or event an assignment including questions, lecture segments, multimedia presentations, outside links, or otherwise. The lecturer can distribute said assignment during the lecture either automatically or by selecting users, and can receive the assignment, which can be completed by assigned users using the user interface 324. The lecturer can then provide and assign grades for particular assignments. The scores and other data obtained from assignments can be grouped by a lecture or a course (i.e. a group of lectures), and the data may be made available to the presenter's manager, e.g. a university administration, conference manager, etc. In embodiments, the assignments may be time-stamped and may only become visible to users at a predetermined time specified by the lecturer.

In embodiments, the system 300 may also facilitate the distribution and streaming of a live American Sign Language ("ASL") interpreter to one or more users, supplementing the transcription capabilities of the system 300 and allowing for interpretation by one interpreter to reach many users, one or more of whom may still prefer to access a lecture through a live interpreter. In embodiments, the ASL interpreter may be remote from the lecturer.

While accommodations for deaf or hard-of-hearing persons has been described, it will be understood that the disclosed embodiments may be utilized for any type of user. For example, blind users may be served by an interface according to embodiments that converts text into alt text and/or braille using a conventional braille converter. Persons with physical, mental, or emotional disabilities may be further served by the disclosed embodiments; for example, persons with physical disabilities may have difficulty taking notes for themselves, but by using a system according to the disclosed embodiments, such as user may be able to receive notes prepared automatically and/or in tandem with real-time editors. Additionally, users who have highlighted or otherwise marked a transcription may share such personal notations with a person having physical disabilities, allowing such as user to have highlighted notes.

Users with learning disabilities such as dyslexia, attention deficit hyperactivity disorder ("ADHD"), and others may benefit from being able to watch, listen, and read a transcript of a lecture in real time or substantially real time, allowing the user to learn according to their individual strengths. Users with mental disabilities may be allowed by the system to learn remotely in a safe environment at a comfortable pace while repeating portions of a lecture or presentation as necessary and while continuing to fully participate in interactive features and assignments.

As it is estimated that 14% of students have a learning disability, providing multiple forms of input using embodiments of the disclosure can improve the students' understanding by reading, hearing, and seeing what a lecturer is presenting, as well as being able to refer back to information. It has been found that retention is improved by 80% with multiple inputs and repetition as facilitated by the disclosed embodiments.

The disclosed embodiments advantageously may apply to an event or lecture that is entirely pre-recorded but can be presented to users in a manner that provides the feel and benefits of a live event, with the interactive features described herein allowing the presenter to time when an interactive feature such as a survey or quiz is presented to the user, and for the user to provide responses at predetermined times and make comments, annotations, and other notes during the event.

By providing a real-time audio transcription, video conferencing, and online collaboration system and method according to the disclosed embodiments, the problem of existing audio transcription, video conferencing, and online collaboration tools being poorly suited to facilitate the participation of all participants, including non-traditional users such as students, users with disabilities such as deaf or hard-of-hearing individuals, in real time is addressed. The disclosed embodiments are suitable for all types of applications, organizations, and events, including businesses, religious organizations, educational institutions, social media applications, and others. The disclosed embodiments advantageously allow for accessible and/or interactive online experiences that facilitate better learning, participation, interaction, and collaboration.

The disclosed embodiments advantageously provide for a system and method that facilitate real-time or substantially real-time automatic transcription and real-time or substantially real-time editing or correction of the automatic transcription, allowing a user who is hard of hearing or deaf to participate in a lecture or event in real time and at much lower cost. The disclosed embodiments additionally provide improved collaboration by allowing users to participate in a lecture or event either in person or remotely.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description.

While certain implementations and details have been included herein and in the attached invention disclosure for purposes of illustrating the invention, it will be apparent to those skilled in the art that various changes in the methods and apparatus disclosed herein may be made without departing from the scope of the invention, which is defined in the appended claims. All changes which come within the meaning and range of equivalency of the claims are to be embraced within their scope.

The invention claimed is:

1. A real-time audio transcription, video conferencing, and online collaboration system, comprising:
   one or more processors; and
   one or more computer-readable hardware storage devices having stored thereon computer-executable instructions that are executable by the one or more processors to cause the real-time audio transcription, video conferencing, and online collaboration system to transcribe audio by causing the real-time audio transcription system to:
      access an audio recording that was generated using a microphone;
      transcribe the audio recording into text;
      cause the text to be displayed text in real-time as the microphone generates the audio recording;
      calculate an accuracy associated with each of the words transcribed;
      and
      set a threshold accuracy and provide a word bank including alternative words from which a user may choose when one or more of the words has an accuracy below the set threshold accuracy.

2. The system of claim 1, wherein:
   transcribing the audio recording comprises transmitting the audio recording to a voice-to-text cloud application.

3. The system of claim 2, wherein:
   a web application is used to transmit the audio recording to the voice-to-text cloud application.

4. The system of claim 1, wherein:
   transcribing the audio recording comprises transmitting the audio recording to a software application stored on the storage device.

5. The system of claim 1, wherein the one or more processors or the hardware storage device is a processor or storage device of a mobile phone or a personal computer.

6. The system of claim 1, wherein the system is configured to allow the text to be edited or corrected by a user or editor in real-time.

7. The system of claim 1, wherein displaying the text in real-time includes providing an algorithm configured to use one or more of a speech feature to segment the audio recording into distinct segments corresponding to distinct phrases, respectively, and to display the phrases to the user.

8. The system of claim 1, wherein the microphone is an omni-directional microphone configured to record audio from two or more audio sources.

9. The system of claim 1, wherein:
   the computer-executable instructions further cause the system to simultaneously conference video by causing the system to:
   receive a video recording produced using a camera; and
   display the video in real-time to the user as the camera produces the video recording.

10. A real-time audio transcription system, comprising:
    a microphone;
    a screen;
    a user interface configured to be displayed on the screen;
    one or more processors; and
    one or more non-transitory computer-readable hardware storage devices having stored thereon computer-executable instructions that are executable by the one or more processors to cause the real-time audio transcription system to transcribe audio by causing the real-time audio transcription system to:
       access an audio recording that was generated using the microphone;
       transcribe the audio recording into text; and
       display the text in real-time as the microphone generates the audio recording,
       calculate an accuracy associated with each of the words transcribed,
       and
       set a threshold accuracy and provide a word bank including alternative words from which a user may choose when one or more of the words has an accuracy below the set threshold accuracy.

11. The system of claim 10, wherein:
    transcribing the audio recording comprises transmitting the audio recording to a voice-to-text cloud application.

12. The system of claim 11, wherein:
    a web application is used to transmit the audio recording to the voice-to-text cloud application.

13. The system of claim 10, wherein:
    transcribing the audio recording comprises transmitting the audio recording to a software application stored on the storage device.

14. The system of claim 10, wherein the one or more processors or the hardware storage device is a processor or storage device of a mobile phone or a personal computer.

15. The system of claim 10, wherein the system is configured to allow the text to be edited or corrected by a user or editor in real-time.

16. The system of claim 10, wherein displaying the text in real-time includes providing an algorithm configured to use one or more of a speech feature to segment the audio recording into distinct segments corresponding to distinct phrases, respectively, and to display the phrases to the user.

17. The system of claim 10, wherein the microphone is an omni-directional microphone configured to record audio from two or more audio sources.

18. The system of claim 10, wherein:
    the computer-executable instructions further cause the system to simultaneously conference video by causing the system to:
    receive a video recording produced using a camera; and
    display the video in real-time to the user as the camera produces the video recording.

19. A method for providing real-time audio transcription, video conferencing, and online collaboration, the method comprising:
    providing a real-time audio transcription system including one or more processors and one or more computer-readable hardware storage devices;
    accessing with the real-time audio transcription system an audio recording that was generated using a microphone;
    transcribing with the real-time audio transcription system the audio recording into text;
    causing by the real-time audio transcription system the text to be displayed by a display device in real-time as the microphone generates the audio recording;
    calculating with the processor of the real-time audio transcription system an accuracy associated with each of the words transcribed; and
    setting by the real-time audio transcription system a threshold accuracy and providing a word bank including alternative words from which a user may choose when one or more of the words has an accuracy below the set threshold accuracy.

20. One or more non-transitory computer-readable mediums having stored thereon instructions which, when executed by a processor of a real-time audio transcription system cause the processor to perform the method according to claim 19.

* * * * *